United States Patent
Takahashi et al.

(10) Patent No.: US 7,942,462 B2
(45) Date of Patent: May 17, 2011

(54) MOTORCYCLE AND RECTIFIER PLATE FOR THE SAME

(75) Inventors: Kuniyuki Takahashi, Iwata (JP); Katsumitsu Wakamatsu, Iwata (JP); Yuuta Kobayashi, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 327 days.

(21) Appl. No.: 12/259,006

(22) Filed: Oct. 27, 2008

(65) Prior Publication Data
US 2009/0127884 A1  May 21, 2009

(30) Foreign Application Priority Data
Oct. 31, 2007  (JP) ................. 2007-284222

(51) Int. Cl.
*B60J 1/20* (2006.01)
(52) U.S. Cl. .................................... 296/95.1
(58) Field of Classification Search ............ 296/78.1, 296/192, 84.1, 95.1, 96
See application file for complete search history.

(56) References Cited

U.S. PATENT DOCUMENTS

| | | | | |
|---|---|---|---|---|
| 2,903,297 | A * | 9/1959 | Zbikowski | 296/78.1 |
| 4,135,758 | A * | 1/1979 | Clements | 296/78.1 |
| 4,331,358 | A * | 5/1982 | Johnson et al. | 296/78.1 |
| 4,461,508 | A * | 7/1984 | Ogishima | 296/78.1 |
| D284,564 | S * | 7/1986 | Kopecky | D12/182 |
| D380,184 | S * | 6/1997 | Heitz, Jr. | D12/182 |
| 5,788,313 | A * | 8/1998 | Willey | 296/78.1 |
| 5,855,404 | A * | 1/1999 | Saunders | 296/78.1 |
| 5,857,727 | A * | 1/1999 | Vetter | 296/78.1 |
| 6,203,093 | B1 * | 3/2001 | Suzuki et al. | 296/78.1 |
| D456,328 | S * | 4/2002 | Meier | D12/182 |
| 6,505,877 | B1 * | 1/2003 | Devlin et al. | 296/78.1 |
| 6,543,831 | B2 * | 4/2003 | Takemura et al. | 296/78.1 |
| 6,979,039 | B2 * | 12/2005 | Takemura et al. | 296/78.1 |
| 7,032,948 | B2 * | 4/2006 | Khan | 296/78.1 |
| D599,724 | S * | 9/2009 | Swender | D12/182 |
| D619,937 | S * | 7/2010 | Paluszkiewicz | D12/114 |
| 7,798,511 | B2 * | 9/2010 | Takenaka et al. | 280/280 |
| 7,828,359 | B2 * | 11/2010 | Caprio | 296/78.1 |
| 7,832,783 | B1 * | 11/2010 | Stadnyk | 296/78.1 |
| 2007/0296237 | A1 * | 12/2007 | Anderson | 296/78.1 |
| 2009/0166118 | A1 * | 7/2009 | Hirai | 180/219 |
| 2010/0025140 | A1 * | 2/2010 | Takenaka et al. | 180/219 |

FOREIGN PATENT DOCUMENTS

| | | | |
|---|---|---|---|
| JP | 2001-071964 | | 3/2001 |
| JP | 2001334977 | A * | 12/2001 |
| JP | 2002160683 | A * | 6/2002 |
| JP | 2004098858 | A * | 4/2004 |
| JP | 2004276862 | A * | 10/2004 |

* cited by examiner

*Primary Examiner* — Hilary Gutman
(74) *Attorney, Agent, or Firm* — Keating & Bennett, LLP (57) ABSTRACT

A motorcycle is provided with a translucent screen board 25 arranged forwardly of a handle 13 which changes a direction of a front wheel according to an operation by a rider and extended obliquely upward toward a rear of a vehicle body, and a rectifier plate 30 extending along the screen board 25 in front of the screen board 25. The rectifier plate 30 prevents dust, etc., from adhering to the screen board when the motorcycle travels.

15 Claims, 7 Drawing Sheets

MOTORCYCLE AND RECTIFIER PLATE FOR THE SAME

This application claims priority under 35 U.S.C. §119 to Japanese Patent Application No. 2007-284222 filed on Oct. 31, 2007, the entire disclosure of which is incorporated herein by reference in its entirety.

BACKGROUND OF THE INVENTION

1. Field of the Invention

The preferred embodiments of the present invention relate, inter alia to a motorcycle, and a rectifier plate to be provided at a front side of a motorcycle.

2. Description of the Related Art

The following description sets forth the inventors' knowledge of related art and problems therein and should not be construed as an admission of knowledge in the prior art.

Some motorcycles are provided with a board, such as, e.g., the so-called screen board, windshield, fairing, and the like, extending obliquely upward in front of a handle to prevent a travel wind from hitting against a rider when the vehicle travels (hereinafter, the board will be referred to as "screen board") (see, for example, Japanese Unexamined Laid-open Patent Publication No. 2001-071964). Such a screen board is generally translucent to secure the front visibility therethrough for the rider.

However, such a screen board easily becomes dirty by dust, insects, etc. (hereinafter simply referred to as "dust"), hitting the screen board while the motorcycle is moving. Also, the screen board shows up dirt due to the translucency.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some preferred embodiments of the present invention can provide a motorcycle capable of preventing a screen board from becoming tainted by adhesion of dirt, etc., thereon.

Among other potential advantages, some preferred embodiments of the present invention can provide a rectifier plate capable of preventing a screen board from becoming tainted by adhesion of dirt, etc., thereon.

According to a first aspect of the present invention, a motorcycle includes a translucent screen board arranged forwardly of a handle which changes a direction of a front wheel according to an operation by a rider and extended obliquely upward toward a rear of a vehicle body, and a rectifier plate extending along the screen board in front of the screen board.

According to this motorcycle, it is possible to prevent the screen board from becoming dirty.

According to a second aspect of the present invention, a rectifier plate for use in a motorcycle is configured to be provided in front of a screen board arranged forwardly of a handle of a motorcycle so that the rectifier plate extends along the screen board in front of the screen board.

With this rectifier plate, the same effects as mentioned above can be obtained.

According to a third aspect of the present invention, a motorcycle screen assembly includes a translucent screen board arranged forwardly of a handle which changes a direction of a front wheel according to an operation by a rider and extended obliquely upward toward a rear of a vehicle body, and a rectifier plate disposed in front of the screen board, wherein the rectifier plate generates an air path to prevent wind from directly hitting the screen board.

With this motorcycle screen assembly, the same effects as mentioned above can be obtained.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
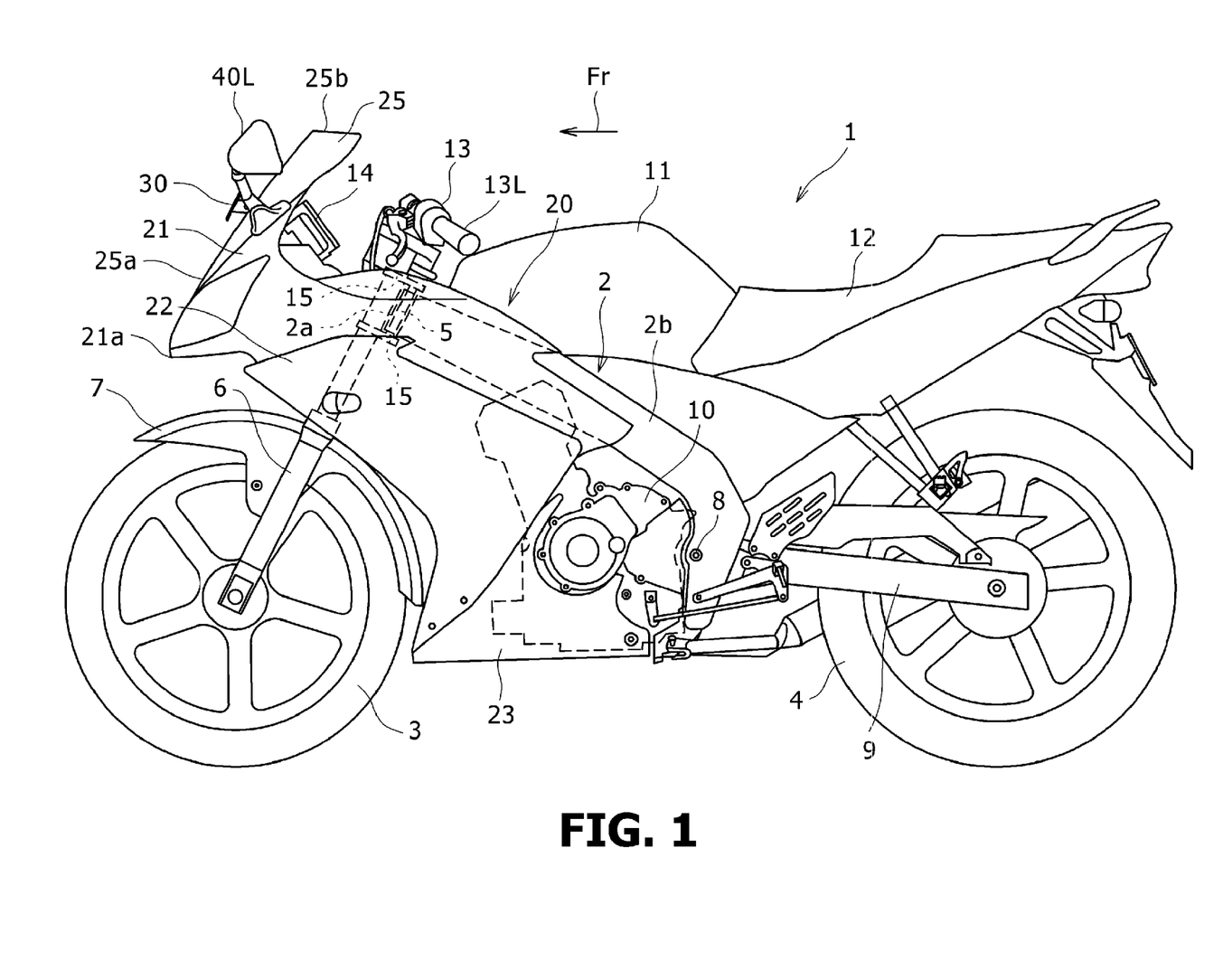
FIG. 1 is a side view showing a motorcycle according to an embodiment of the invention.
Figure 2:
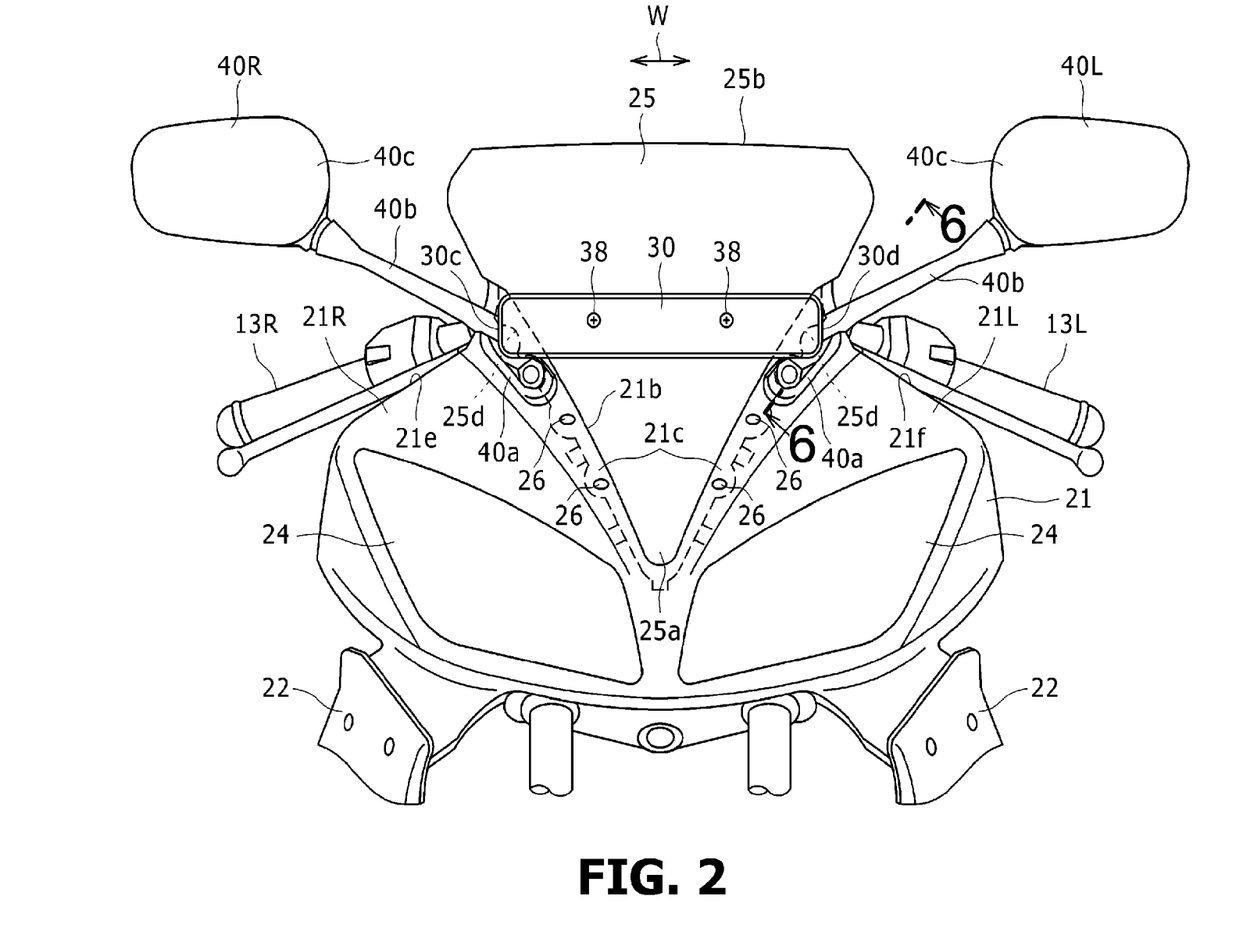
FIG. 2 is a front view showing an upper front portion of the motorcycle.
Figure 3:
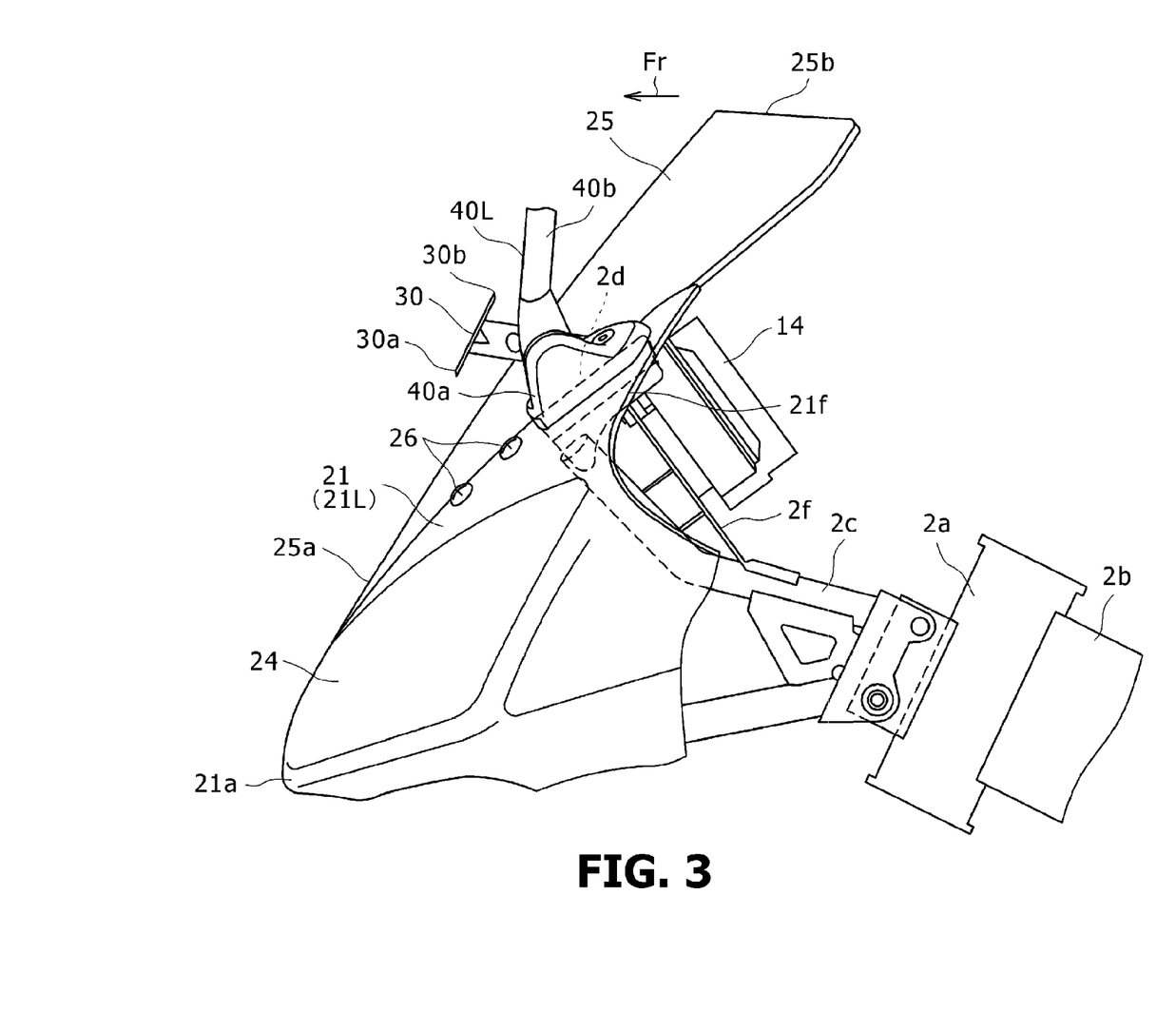
FIG. 3 is an enlarged side view showing a front portion of the motorcycle.
Figure 4:
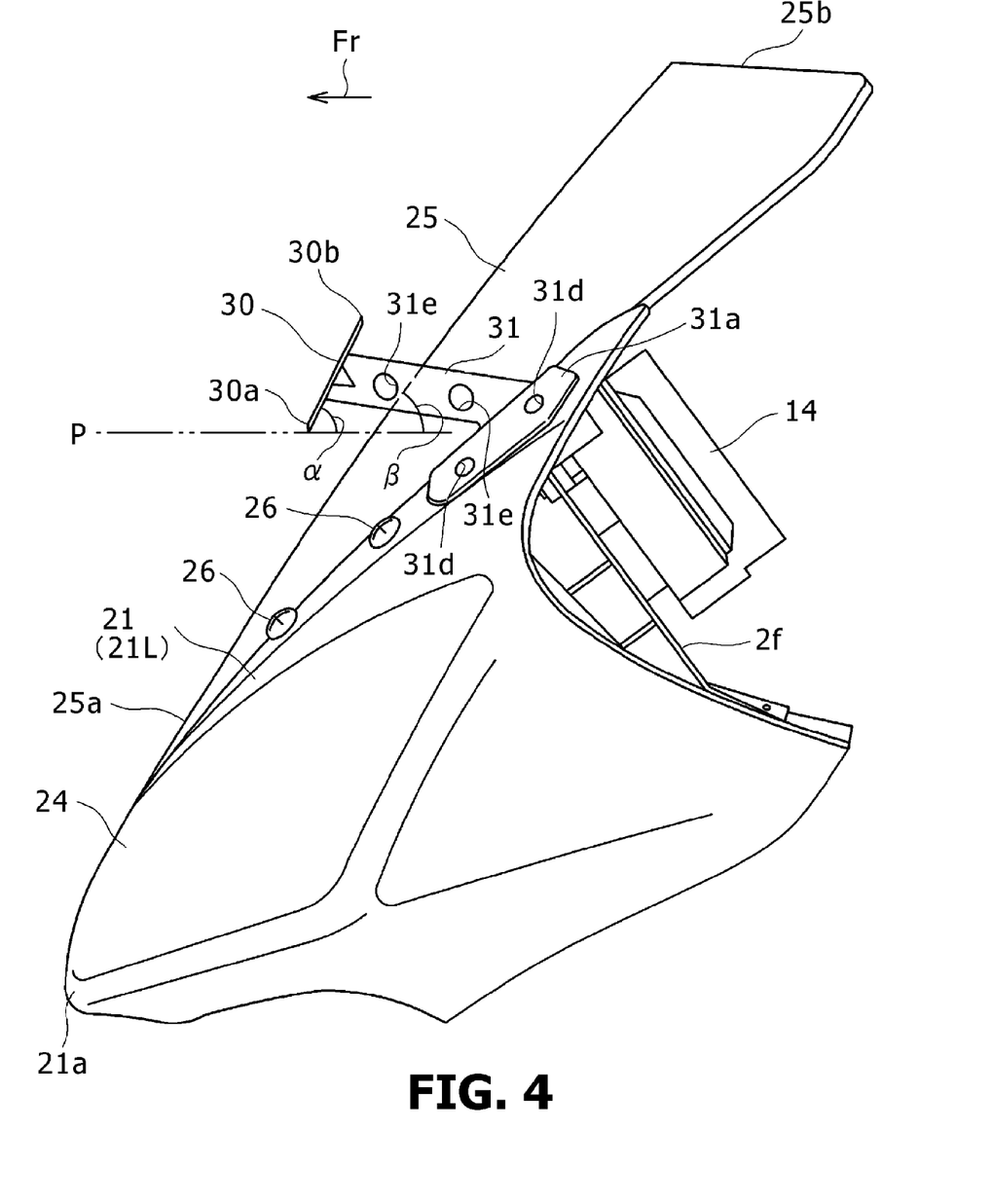
FIG. 4 is an enlarged side view showing the front portion of the motorcycle, from which a side mirror is removed.

Hereinafter, an embodiment of the present invention will be described with reference to the attached drawings. FIG. 1 is a side view showing a motorcycle 1 according to an embodiment of the invention. FIG. 2 is a front view showing an upper portion of the motorcycle 1. FIG. 3 is an enlarged side view showing a front portion of the motorcycle 1. FIG. 4 is an enlarged side view showing the front portion of the motorcycle 1 from which a side mirror 4 is removed. It should be noted that FIG. 2 depicts only the upper portion of the motorcycle 1.

As shown in FIGS. 1 and 2, the motorcycle 1 includes a body frame 2, a cowl 20, a screen board 25, a rectifier plate 30, side mirrors 40R and 40L, an engine 10, a front wheel 3, and a rear wheel 4.

As shown in FIG. 1, a steering shaft 5 extending obliquely upward is arranged on the front portion of the motorcycle 1. The steering shaft 5 is mounted to an obliquely upwardly extending front fork 6 through two brackets 15 and 15 aligned vertically. An axle shaft of the front wheel 3 is supported by the lower end of the front fork 6. A front fender 7 covers the front wheel 3 from above.

The steering shaft 5 is supported rotatably by a head pipe 2a provided at the front end of the body frame 2. A main frame 2b extends obliquely downward toward the rear of the vehicle body from the head pipe 2a. The engine 10 is arranged below by the main frame 2b. The engine 10 is suspended by the main frame 2b. A pivot shaft 8 supported by the main frame 2b is arranged rearwardly of the engine 10. A front end of a rear arm 9 extending longitudinally of the vehicle body is connected to the pivot shaft 8 and a rear end of the rear arm 9 supports an axle shaft of the rear wheel 4. The rear wheel 4 and the rear arm 9 move up and down about the pivot shaft 8 as a fulcrum according to road surface irregularities when a vehicle travels. A driving force outputted from the engine 10 is transmitted to the rear wheel 4 through a chain (not shown).

A fuel tank 11 that stores a fuel being consumed by the engine 10 is arranged above the main frame 2b. A seat 12, on which a passenger is seated, is arranged rearwardly of the fuel tank 11.

A handle 13 for changing the direction of the front wheel 3 according to the operation by the rider is arranged at the front side (i.e., at the side in the direction indicated by the arrow Fr in FIG. 1) of the fuel tank 11. Grips 13L and 13R grasped by a rider are arranged at both right and left ends of the handle 13 (see FIG. 2). An upper side bracket 15 is arranged so as to extend in a vehicle width direction (in the direction indicated by the arrow W in FIG. 2) and the handle 13 is connected to the upper portion of the steering shaft 5 through the bracket 15. The steering shaft 5, the front fork 6, and the front wheel 3 turn together right and left. A meter 14 comprising a speed meter representative of the traveling speed of the motorcycle 1, a tachometer representative of the rotating speed of the engine 10, etc., is arranged forwardly of the handle 13.

The motorcycle 1 is the so-called full cowl type vehicle, and the cowl 20 includes a front cowl 21, side cowls 22, and an under cowl 23.

The under cowl 23 is arranged forwardly of the engine 10 to cover a front side of the engine 10. The side cowls 22 are provided so as to extend obliquely upward toward the front of the vehicle body from the front of the engine 10 as viewed from the lateral side of the vehicle to cover both right and left sides of the front portion of the vehicle body. FIG. 1 depicts only the left side cowl 22.

The front cowl 21 is one that covers the front of the vehicle body, and is positioned upwardly of the front wheel 3 and forwardly of the meter 14. The front cowl 21 is integrally formed with the screen board 25 to assume a streamline shape and extended obliquely upward toward the rear of the vehicle body from the lower edge (front edge) 21a thereof as viewed from the side. Also, the front cowl 21 is curved so that its vehicle widthwise central portion projects forward. Further, as shown in FIG. 2, the front cowl 21 is substantially V-shaped to open upward and formed, at a center thereof, with a triangular-shaped cutout 21b.

Headlight covers 24 and 24, respectively, are mounted to a right plate portion 21R positioned on the right side (simply referred to as "right side" of the cutout 21b of the front cowl 21 in a vehicle traveling direction (direction indicated by the arrow Fr in FIG. 1) and a left plate portion 21L positioned on the left side (simply referred to as "left side" of the cutout 21b in the vehicle traveling direction. The headlight covers 24 and 24 are mounted so that edges thereof are flush with the edges of the right plate portion 21R and the left plate portion 21L. Headlights (not shown) are arranged at the back (rear side) of the headlight covers 24 and inwardly of the front cowl 21.

As shown in FIG. 2, the screen board 25 is a member in the form of a substantially triangular-shaped board having a size corresponding to the cutout 21b of the front cowl 21. Widthwise edges 25d and 25d of the screen board 25 are positioned behind edges 21c and 21c of the cutout 21b and mounted to the edges 21c and 21c by a plurality (four in this embodiment) of bolts 26. The screen board 25 is translucent and molded from translucent acrylic resin or polycarbonate.

The screen board 25 is arranged forwardly of the handle 13. More specifically, as shown in FIGS. 1 and 2, the screen board 25 is positioned forwardly of the handle 13 as viewed from the lateral side of the vehicle and positioned at the widthwise central portion of the vehicle as viewed from the front side. Also, the screen board 25 extends obliquely upward from a position below the handle 13 to reach a position above the handle 13 and the meter 14. That is, the lower end 25a of the screen board 25 is positioned below the handle 13, the screen board 25 extends obliquely upward from the lower end 25a, and the upper edge 25b thereof is positioned above the handle 13 and the meter 14 (see FIG. 3). In this manner, the screen board 25 arranged forwardly of the handle 13 prevents a travel wind from hitting directly against a rider who operates the handle 13. In addition, as shown in FIG. 2, the upper edge 25b is positioned to be higher than the upper edge 21e of the right plate portion 21R of the front cowl 21 and the upper edge 21f of the left plate portion 21L. Also, the screen board 25 is curved so that its widthwise central portion projects forward.

As shown in FIGS. 2 and 3, the side mirrors 40R and 40L, respectively, are arranged on the right and left of the screen board 25. As shown in FIG. 2, the side mirrors 40R and 40L, respectively, comprise mount seats 40a mounted to the edges 21c and 21c of the cutout 21b of the front cowl 21, mirror stays 40b supported on the mount seats 40a and extended laterally (vehicle width direction) from the mount seats 40a, and mirrors 40c provided at tip ends of the mirror stays 40b.

An explanation will be given to the rectifier plate 30. The rectifier plate 30 is arranged forwardly of the screen board 25 to prevent a travel wind from hitting directly against the screen board 25 when a vehicle travels, thus preventing dust, insects, etc., which comes on the travel wind to fly, from adhering to the screen board 25. As shown in FIG. 2, the rectifier plate 30 is a rectangular-shaped plate member extending in the vehicle width direction.

As shown in FIG. 4, the rectifier plate 30 extends obliquely upward along the surface of the screen board 25 from the lower edge 30a thereof in front of the screen board 25. In this embodiment, the rectifier plate 30 is supported in a posture inclined to the screen board 25 so that the angle α between the rectifier plate 30 and a horizontal plane P is larger than the angle β between the screen board 25 and the horizontal plane P. The rectifier plate 30 is positioned forwardly of a heightwise central portion of the screen board 25 with a gap provided between the surface of the screen board 25 and the rectifier plate 30. Also, the heightwise length of the rectifier plate 30 is shorter than the heightwise length of the screen board 25. The upper edge 30b of the rectifier plate 30 is positioned to be lower than the upper edge 25b of the screen board 25 and the lower edge 30a of the rectifier plate 30 is positioned to be higher than the lower end 25a of the screen board. Also, the rectifier plate 30 is positioned between the upper edge (rear end) 25b and the lower end (front end) 25a of the screen board 25 in the longitudinal direction of the vehicle.

As shown in FIG. 2, the rectifier plate 30 is positioned between the mount seats 40a and 40a of the side mirrors 40R and 40L as viewed from the front side. The right edge 30c of the rectifier plate 30 in the vehicle width direction is positioned rightwardly of the right edge 25d of the screen board 25 and the left edge 30d in the vehicle width direction is positioned leftwardly of the left edge 25d of the screen board 25. The rectifier plate 30 can be, for example, a number plate or a license plate with a registration number of the vehicle described on the surface thereof.

Figure 5:
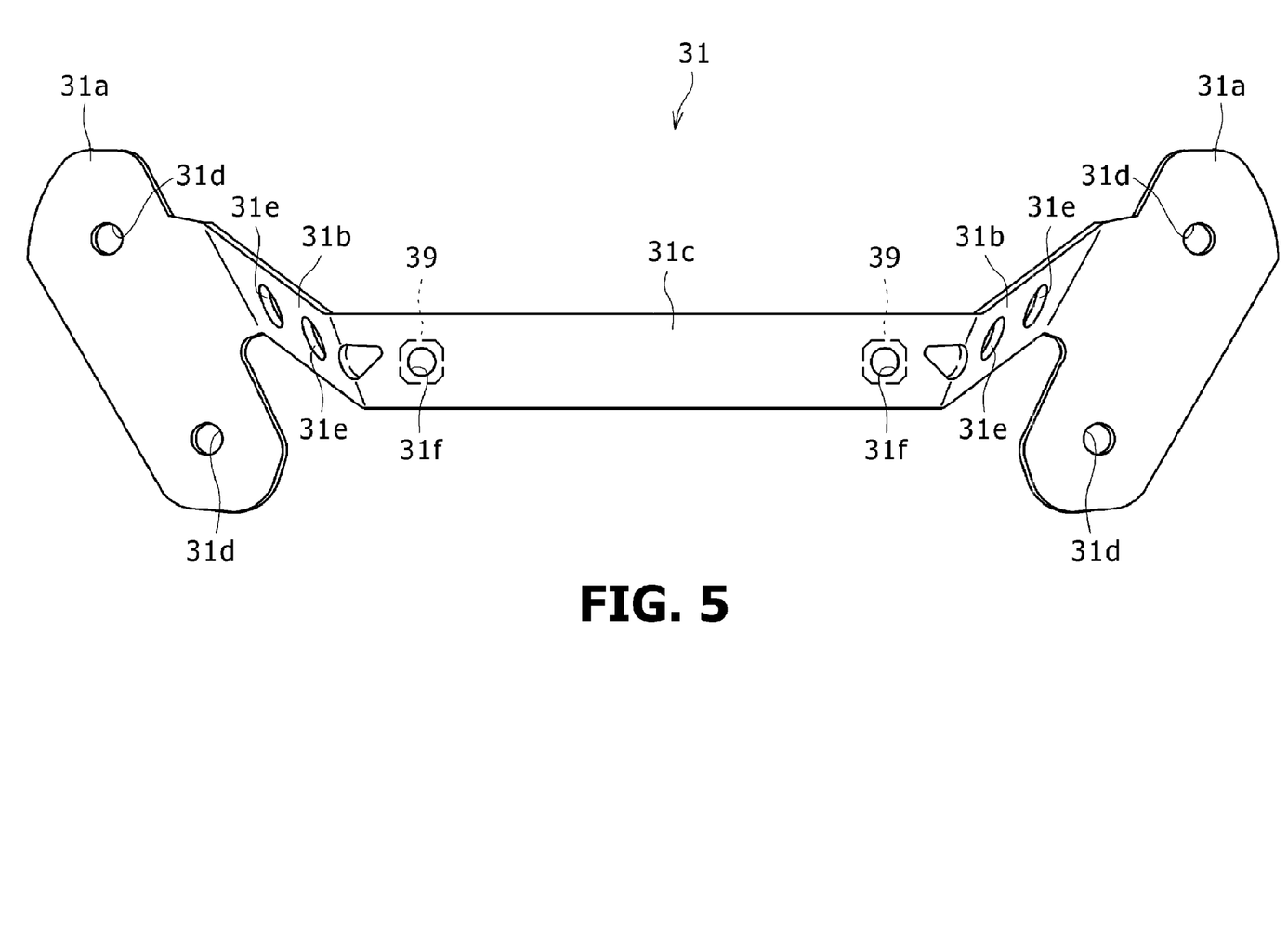
FIG. 5 is a plan view showing a stay that supports a rectifier plate.

As shown in FIGS. 3 and 4, the rectifier plate 30 is supported in front of the screen board 25 by a stay 31. FIG. 5 is a plan view showing the stay 31. As shown in this figure, the stay 31 includes plate-shaped bases 31a and 31a fixed to the vehicle body, extensions 31b and 31b extended forward from the bases 31a, and a mount 31c bent from ends of the extensions 31b and 31b and extended in the vehicle width direction. The rectifier plate 30 is mounted to the mount 31c.

Figure 6:
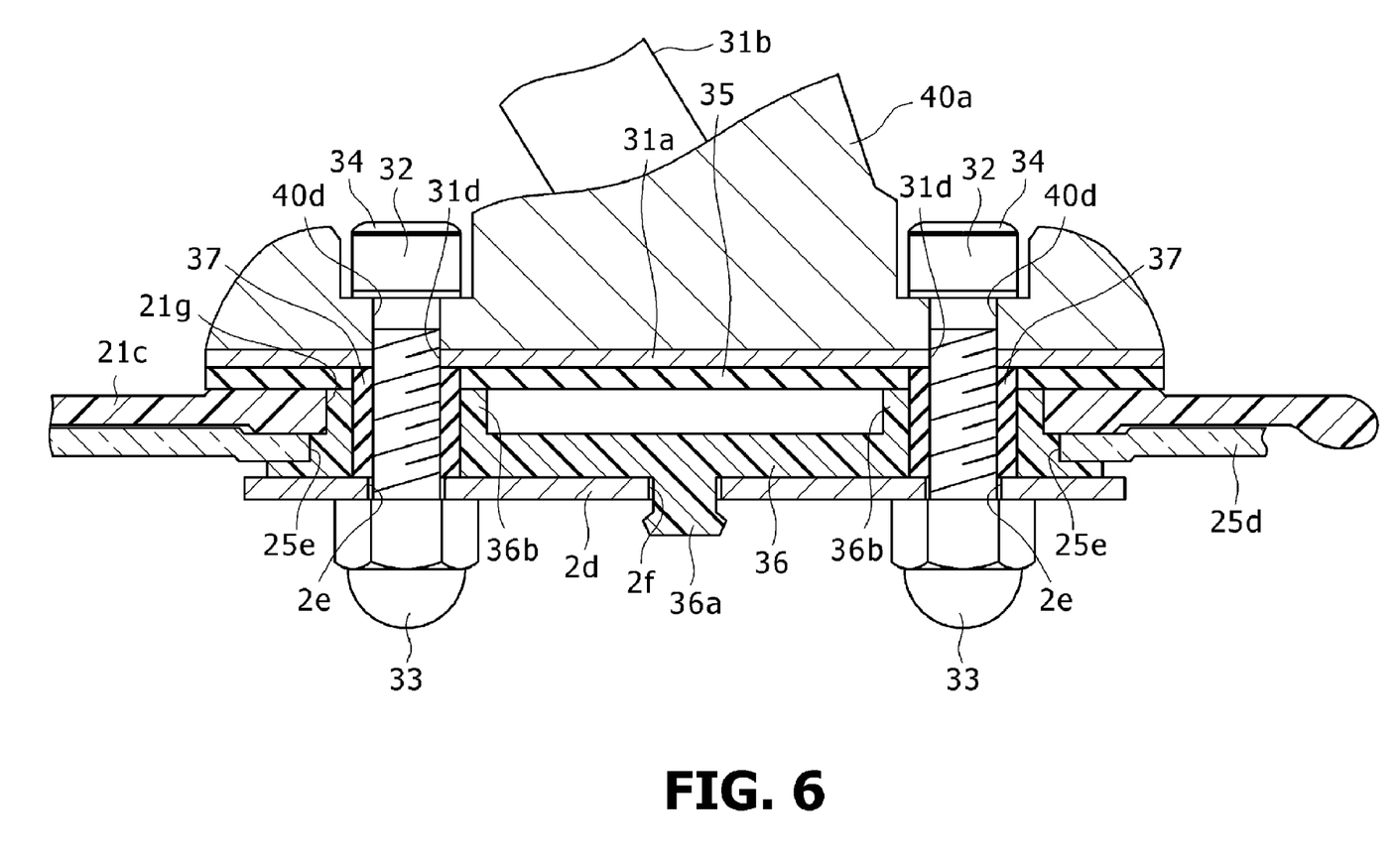
FIG. 6 is a cross-sectional view taken along the line 6-6 in FIG. 2.
Figure 7:
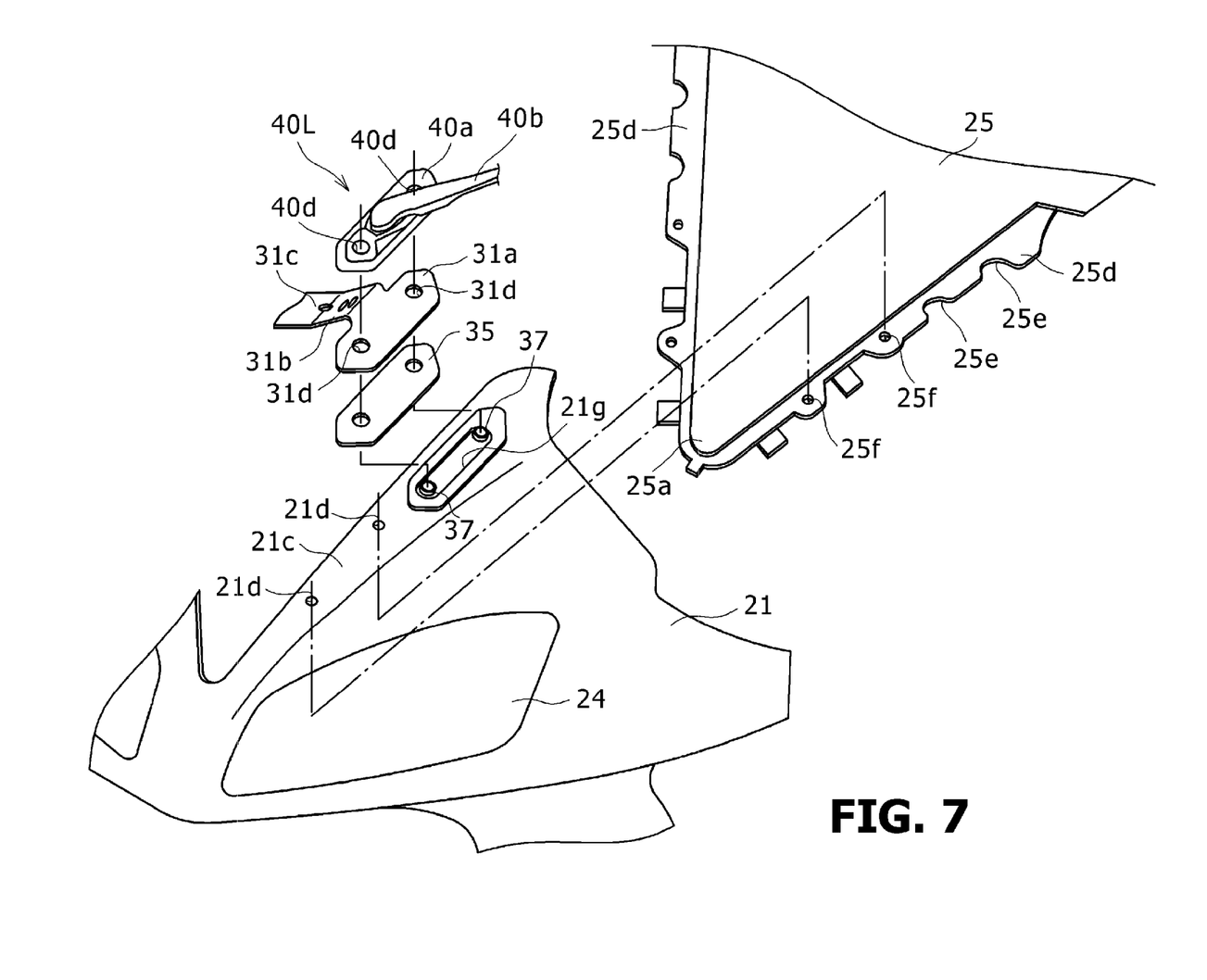
FIG. 7 is an exploded perspective view showing a front cowl, a screen board, the stay, and the side mirror.

The bases 31a and 31a and the mount seats 40a and 40a of the side mirrors 40R and 40L are mounted to the vehicle body by common bolts 32 and 32. FIG. 6 is a cross-sectional view taken along the line 6-6 in FIG. 2 and FIG. 7 is an exploded perspective view showing the front cowl 21, the screen board 25, the stay 31, and the side mirror 40L. Here, the following explanation will be directed to the mount structure of the left base 31a of the stay 31 and the side mirror 40L. The mount structure of the right base 31a of the stay 31 and the side mirror 40R is the same as that on the left side and so the explanation will be omitted.

As shown in FIG. 5, two mount holes 31d and 31d aligned in a longitudinal direction are formed in the base 31a of the stay 31. Also, as shown in FIGS. 6 and 7, two mount holes 40d and 40d aligned in a longitudinal direction are formed in the mount seat 40a of the side mirror 40L. Also, as shown in FIG. 3, a stay 2c extending forward is mounted to the head pipe 2a positioned at the front end of the body frame 2 and a bracket 2d is provided at the tip end of the stay 2c. As shown in FIG. 6, two mount holes 2e and 2e aligned in a longitudinal direction are also formed in the bracket 2d. A longitudinally lengthy slot 21g is formed in the edge portion 21c of the cutout 21b of the front cowl 21 (see FIG. 7), and the mount holes 31d and 31d, the mount holes 40d and 40d, and the mount holes 2e and 2e are positioned inwardly of the slot 21g. Bolts 32 and 32 are inserted through the mount holes 31d and 31d formed in the base 31a of the stay 31, the mount holes 40d and 40d of the side mirror 40L, and the mount holes 2e and 2e of the bracket 2d and nuts 33 and 33 are tightened to the bolts 32 and 32 from the back side of the bracket 2d. In this manner, the stay 31 and the side mirror 40L are fixed to the body frame 2 by the common bolts 32 and 32.

In addition, the stay 2c extended from the head pipe 2a bifurcates midway to extend outward in the vehicle width direction and the bracket 2d is provided at the tip end thereof. Also, as shown in FIG. 3, a plate-shaped bracket 2f is provided on the stay 2c to support the meter 14.

Also, as shown in FIG. 7, substantially semi-circular cutouts 25e and 25e are formed on the edges 25d of the screen board 25 to be positioned corresponding to the bolts 32 and 32. As shown in FIG. 6, the edges of the cutouts 25e are interposed between the bracket 2d of the stay 2c and the edges of the slot 21g of the front cowl 21.

Also, as shown in FIGS. 6 and 7, a thin cushioning member 35 formed from, for example, rubber is interposed between the base 31a of the stay 31 and the edge portion 21c of the front cowl 21. Also, bolt covers 34 are fitted onto the heads of the bolts 32 to close holes (for example, hexagonal holes) formed on the heads of the bolts 32.

Also, as shown in FIG. 6, a cushioning member 36 formed from, for example, rubber is interposed between the bracket 2d and the edge portion 21c of the front cowl 21. The cushioning member 36 is provided with a projection 36a for preventing the relative movements of the cushioning member 36 and the bracket 2d. The projection 36a is fitted into a hole 2f formed in the bracket 2d. Also, the cushioning member 36 is provided with holes 36b and 36b through which the bolts 32 and 32 are inserted, and the edges of the holes 36b and 36b rise in a direction in which the bolts 32 and 32 are extended. Cylindrical-shaped collars 37 and 37 are arranged in the holes 36b and 36b, and the bolts 32 and 32 are inserted through the collars 37 and 37.

As shown in FIGS. 4 and 6, the extensions 31b of the stay 31 extend toward the front of the vehicle from between the mount holes 31d and 31d formed in the base 31a. The direction in which the extensions 31b extend is inclined downward to a direction perpendicular to the edges 25d of the screen board 25.

As shown in FIG. 5, the mount 31c is a plate-shaped member extending in the vehicle width direction and bridging the right and left extensions 31b and 31b. As shown in FIG. 2, the rectifier plate 30 is fixed to the mount 31c by bolts 38 and 38. In addition, as shown in FIG. 5, the mount 31c is provided with mount holes 31f and 31f for insertion of the bolts 38 and 38 and nuts 39 and 39 are mounted to back surfaces of edges of the mount holes 31f and 31f. The bolts 38 and 38 are screwed into the nuts 39 and 39 whereby the rectifier plate 30 is fixed to the mount 31c.

Also, the extension 31b is provided with a plurality (two in this embodiment) of holes 31e and 31e to trim the weight of the stay 31.

Also, as shown in FIG. 7, the screen board 25 is provided with two mount holes 25f and 25f aligned longitudinally at the front side of the cutouts 25e and 25e of the screen board 25. On the other hand, two mount holes 21d and 21d are formed in corresponding positions of the edge portion 21c of the front cowl 21. Bolts 26 are inserted through the mount holes 21d and 21d and the mount holes 25f and 25f of the screen board 25 whereby the screen board 25 is fixed to the front cowl 21 (see FIG. 2).

In the motorcycle 1 described above, the rectifier plate 30 extending along the screen board 25 is provided in front of the translucent screen board 25 arranged forwardly of the handle 13 and extending obliquely upward toward the rear of a vehicle body. This prevents dust, etc. from adhering to the screen board 25.

Also, in this motorcycle 1, the angle α between the rectifier plate 30 and the horizontal plane P is larger than the angle β between the screen board 25 and the horizontal plane P. This further effectively prevents a travel wind from hitting directly against the screen board 25, thus enabling effectively preventing dust, etc., from adhering to the screen board 25.

Furthermore, in this motorcycle 1, the upper edge 30b of the rectifier plate 30 is positioned to be lower than the upper edge 25b of the screen board 25. This prevents dust, etc., from adhering to the screen board 25 while maintaining a favorable visibility in the vehicle traveling direction.

Furthermore, in this motorcycle 1, the upper edge 30b of the rectifier plate 30 is positioned below the upper edge 25b of the screen board 25 and the lower edge 30a of the rectifier plate 30 is positioned to be higher than the lower end 25a of the screen board 25. This maintains a favorable visibility in the vehicle traveling direction.

Also, the motorcycle 1 is provided with the stay 31 supporting the rectifier plate 30 in front of the screen board 25 and a direction in which the stay 31 extends is inclined downwardly to a direction perpendicular to the screen board 25. Thereby, the rectifier plate 30 can be positioned to be lower than the screen board 25, thus enabling preventing dust, etc. from adhering to the screen board 25 while maintaining a favorable visibility in the vehicle traveling direction.

Also, the motorcycle 1 is provided with the side mirrors 40R and 40L mounted to the front portion of the vehicle to enable seeing the rear of the vehicle, and the stay 31 supporting the rectifier plate 30 in front of the screen board 25. The mount seat 40a positioned at the base of the side mirror 40L and the stay 31 are mounted to the vehicle body by the common bolts 32 and 32. Thereby, it is possible to reduce the number of parts that support the rectifier plate 30.

Also, the screen board 25 is formed from acrylic resin or polycarbonate. Thereby, it is possible to make the screen board 25 light in weight.

Also, as described above, the rectifier plate 30 is, for example, a number plate or a license plate. In this case, it is possible to improve the visibility of the registration number of the vehicle.

It should be noted that the present invention is not limited to the aforementioned motorcycle 1, but allows various modifications. For example, in the aforementioned motorcycle 1, the rectifier plate 30 is supported forwardly of the heightwise central portion of the screen board 25. However, the rectifier plate can be supported forwardly of a lower portion of the screen board 25.

Also, in the aforementioned motorcycle 1, the rectifier plate 30 is a rectangular-shaped member. However, the rectifier plate can be formed into a triangular-shape corresponding to the shape of the screen board 25.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as an non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:

1. A motorcycle comprising:
    a translucent screen board arranged forwardly of a handle which changes a direction of a front wheel according to an operation by a rider and extended obliquely upward toward a rear of a vehicle body; and
    a rectifier plate extending along the screen board disposed in front of the screen board; wherein
    an uppermost edge of the rectifier plate is arranged below an uppermost edge of the screen board;
    a lowermost edge of the rectifier plate is arranged above a lowermost edge of the screen board; and
    the rectifier plate has a substantially rectangular shape.

2. The motorcycle as recited in claim 1, wherein the rectifier plate is disposed so that an angle between the rectifier plate and a horizontal plane is larger than an angle between the screen board and the horizontal plane.

3. The motorcycle as recited in claim 1, further comprising a stay for supporting the rectifier plate in front of the screen board,
    wherein a direction in which the stay extends is inclined downwardly to a direction perpendicular to the screen board.

4. The motorcycle as recited in claim 1, further comprising:
    a side mirror mounted to a front portion of the vehicle body to allow seeing a rear portion of the vehicle body; and
    a stay that supports the rectifier plate in front of the screen board,
    wherein a mount seat is positioned on a base portion of the side mirror, and the stay and the side mirror are mounted to the vehicle body by a common bolt.

5. The motorcycle as recited in claim 1, wherein the rectifier plate is formed from acrylic resin or polycarbonate.

6. The motorcycle as recited in claim 1, wherein the rectifier plate is a license plate.

7. The motorcycle as recited in claim 1, wherein the rectifier plate is a plate member extending in a widthwise direction of the vehicle.

8. A rectifier plate for use in a motorcycle,
    wherein the rectifier plate is configured to be provided in front of a screen board arranged forwardly of a handle of a motorcycle so that the rectifier plate extends along the screen board in front of the screen board;
    an uppermost edge of the rectifier plate is arranged to be below an uppermost edge of the screen board;
    a lowermost edge of the rectifier plate is arranged to be above a lowermost edge of the screen board; and
    the rectifier plate has a substantially rectangular shape.

9. The rectifier plate as recited in claim 8, wherein the rectifier plate is configured to be disposed so that an angle between the rectifier plate and a horizontal plane is larger than an angle between the screen board and the horizontal plane.

10. The rectifier plate as recited in claim 8, further comprising a stay for supporting the rectifier plate in front of the screen board,
    wherein a direction in which the stay extends is inclined downwardly to a direction perpendicular to the screen board.

11. The rectifier plate as recited in claim 8, wherein the rectifier plate is formed from acrylic resin or polycarbonate.

12. The rectifier plate as recited in claim 8, wherein the rectifier plate is a license plate.

13. The rectifier plate as recited in claim 8, wherein the rectifier plate is a plate member extending in a widthwise direction of the vehicle.

14. A motorcycle screen assembly comprising:
    a translucent screen board arranged forwardly of a handle which changes a direction of a front wheel according to an operation by a rider and extended obliquely upward toward a rear of a vehicle body; and
    a rectifier plate disposed in front of the screen board, wherein the rectifier plate generates an air path to prevent wind from directly hitting the screen board; wherein
    an uppermost edge of the rectifier plate is arranged below an uppermost edge of the screen board;
    a lowermost edge of the rectifier plate is arranged above a lowermost edge of the screen board; and
    the rectifier plate has a substantially rectangular shape.

15. The motorcycle screen assembly as recited in claim 14, wherein the air path diverts dust from the screen board.

\* \* \* \* \*